United States Patent [19]

Mueller et al.

[11] Patent Number: 5,727,527
[45] Date of Patent: Mar. 17, 1998

[54] METHOD FOR CYLINDER CUT-IN IN AN INTERNAL COMBUSTION ENGINE PROCESS

[75] Inventors: Stephan Mueller, Leonberg; Dietmar Schwarzenthal, Ditzingen, both of Germany

[73] Assignee: Ing. h.c.F. Porsche AG, Weissach, Germany

[21] Appl. No.: 635,139

[22] Filed: Apr. 19, 1996

[30] Foreign Application Priority Data

Apr. 19, 1995 [DE] Germany .................. 195 13 889.9

[51] Int. Cl.$^6$ .................................................. F02D 17/02
[52] U.S. Cl. ........................... 123/481; 123/198 F
[58] Field of Search .................. 123/198 F, 481, 123/681, 682

[56] References Cited

U.S. PATENT DOCUMENTS

| | | | |
|---|---|---|---|
| 4,550,704 | 11/1985 | Barho et al. | 123/481 |
| 5,337,720 | 8/1994 | Murakami et al. | 123/481 |
| 5,481,461 | 1/1996 | Miyamoto et al. | 123/481 X |
| 5,492,100 | 2/1996 | Ishii et al. | 123/481 |

*Primary Examiner*—Tony M. Argenbright
*Attorney, Agent, or Firm*—Evenson, McKeown, Edwards & Lenahan, P.L.L.C.

[57] ABSTRACT

A method for cylinder cut-in in an internal combustion engine, with the engine having on a portion of its cylinders. The charge changing valves can be cut out as well as a switchable fuel supply, both of which can be switched from a cut-out or cut-off state to a cut-in state and vice versa. In order to provide a method for cylinder cut-in that permits a safe transition from operation in which they are cut out to one in which they are not cut out, and by which the effects of this switch are exhaust behavior are minimized, the charge changing valves are cut in first and then, after checking to determine whether the charge changing valves have been switched, the fuel supply is cut in to the cylinders that were previously cut out.

7 Claims, 4 Drawing Sheets

METHOD FOR CYLINDER CUT-IN IN AN INTERNAL COMBUSTION ENGINE PROCESS

BACKGROUND OF THE INVENTION

The invention relates to a method for cylinder cut-in in an internal combustion engine, with the engine having charge changing valves that can be cut out on a portion of its cylinders, and a switchable fuel supply, both of which can be switched from a cut-out or deactivated state to a cut-in or activated state and vice versa.

In order to be able to operate internal combustion engines economically in load states that are significantly below the full load state, only a portion of the cylinders are operated with firing. In order to prevent any charge changing losses in the cut-out cylinders, provision is also made to cut out the charge changing valves of the cylinders to be cut out in addition to cutting off the fuel supply.

If load states recur requiring operation of all cylinders, one possible cylinder cut-in method consists in first cutting in the charge changing valves of the cut-out cylinders and then cutting in the fuel supply as well after a predefined waiting time. Such a method suffers from the disadvantage that during the time when the fuel supply is cut off but air is still being supplied through the cylinders that have already been cut in, the exhaust is highly diluted and cooled, so that a catalytic converter connected to the internal combustion engine can no longer operate properly.

Therefore, a goal of the invention is to provide a cylinder cut-in method that permits a safe transition from operation with cylinders cut out to operation with cylinders cut in, and minimizes the influence of cylinder cut-in on fuel consumption and exhaust behavior.

These and other goals have been accomplished according to the present invention by providing a method for cylinder cut-in in an internal combustion engine having a plurality of cylinders, at least one of the cylinders having switchable charge changing valves and a switchable fuel supply, the switchable charge changing valves and the switchable fuel supply being switchable between a cutout state and a cut-in state, wherein the method comprises the steps of cutting in the charge changing valves; checking to see whether the charge changing valves have been switched; and cutting in the fuel supply to the cylinders if the charge changing valves have been switched.

According to the invention, provision is made first to cut in the charge changing valves and when, after a test to determine whether the charge changing valves have been switched, to cut in the fuel supply to the cylinders that have thus far been cut out. As a result of this method, the two processes are adjusted optimally to one another, since after successful restarting the fuel supply is also cut in at the next possible point in time. The change in exhaust is thus limited to the shortest possible time interval. In addition, before the charge changing valves have been cut out, fuel is reliably prevented from accumulating and then entering the combustion chamber when the charge changing valves are cut in and if present in sufficiently large quantities, blocking this cylinder, which can lead to destruction of the engine. Thus, the disadvantages described above can be successfully avoided with the invention.

Advantageous methods for calculating the optimum times required for cut-in are described below.

By virtue of the proposed operation of the engine with a replacement signal for the signal supplied by a lambda probe, the residual deviation in the exhaust composition can be suppressed during the cutting in of the charge changing valves and the fuel supply to the cylinders that have not been fired previously.

To determine whether the charge changing valves have been cut in, two methods are proposed. A method based on monitoring the oil pressure can be performed especially simply and also makes it possible, by adjusting a stored value of the time required for cutting in, to keep the process of cylinder cut-in as a function of time exactly determinable in advance. An alternatively proposed method that is based on monitoring the closing pulse that is generated when a charge changing valve strikes the valve seat, on the other hand, operates more exactly at higher expense; here again it is possible, by adjusting a stored value, for the time required for cutting in to keep the curve of cylinder cut-in as a function of time exactly determinable in advance.

Finally it is proposed to intercept torque pulses that occur as the result of cutting in the previously unfired cylinders by changing the ignition angle so that in all a steady and hence more comfortable transition in the torque takes place during switching. At the same time, fuel is supplied in such fashion that an essentially stoichiometric exhaust composition results.

These and other objects, features and advantages of the present invention will become more readily apparent from the following detailed description when taken in conjunction with the accompanying drawings.

DETAILED DESCRIPTION OF THE DRAWINGS

Figure 1:
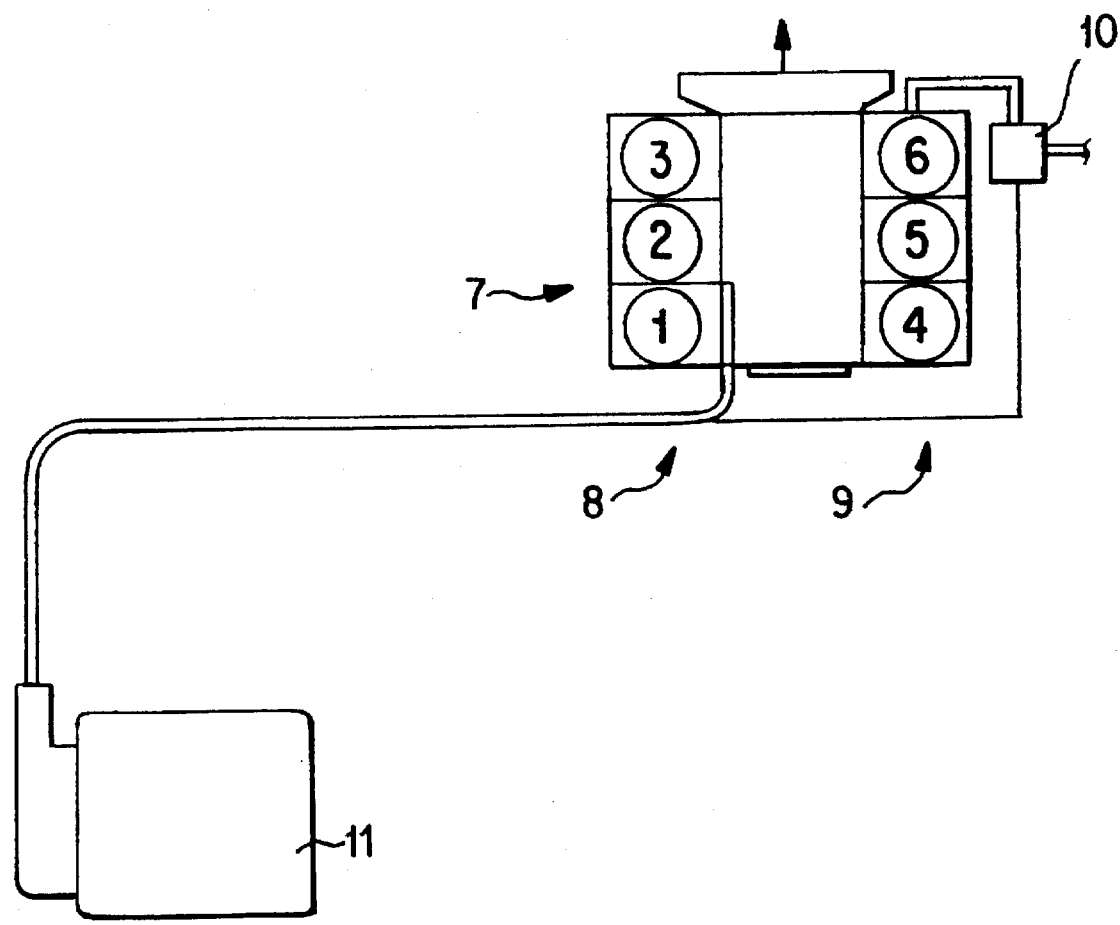
FIG. 1 is a schematic diagram of an internal combustion engine suitable for the application of cylinder cut-in according to the present invention.

Internal combustion engine 7 in FIG. 1 is a six-cylinder horizontally-opposed piston engine with cylinders 1 to 6. Cylinders 1 to 3 form a first cylinder bank 8 and cylinders 4 to 6 form a second cylinder bank 9. The charge changing valves, not shown in greater detail, are operated by a camshaft, and the charge changing valves in second cylinder bank 9 are also capable of being cut in and out. In the present embodiment, the charge changing valves in second cylinder bank 9 are only cut in when a hydraulic control pressure is applied through a hydraulic valve 10 from a hydraulic pressure source not shown in greater detail. A central control device 11 controls both the internal combustion engine in general and hydraulic valve 10 in particular. For this purpose, control device 11 detects the following parameters: an idle signal II, a reference mark signal from the camshaft BOT, an engine temperature tmot, an oil temperature of the hydraulic oil töl, an oil pressure of the hydraulic oil pöl, a load signal DK generated by the driver, a signal for the exhaust composition lambda, an engine rpm nmot, an air mass Im, and a signal from one or more detonation sensors. Depending on these parameters, control device 11 generates a signal for injection duration ti, ignition signals ig, as well as a switch signal zhy for hydraulic valve 10. The injection time ti and the ignition signal ig are generated separately for each of cylinders 1 to 6 or at least for each of cylinder banks 8 and 9, and are supplied to engine 7.

With the aid of a characteristic map which is not shown and which extends over the air mass Lm and the engine rpm nmot, a decision is made in control device 11 as whether engine 7 is to be operated in three-cylinder operation, i.e. only on cylinders 1 to 3, or in six-cylinder operation, i.e. on cylinders 1 to 6. The starting point for the method described below is that engine 7 is in three-cylinder operation and the limit to three-cylinder operation has now been crossed in the abovementioned characteristic map.

The method described below is applied as a whole to second cylinder bank 9, in other words all of the charge changing valves, the fuel supply, and the ignition of second cylinder bank 9 are controlled simultaneously. For this purpose, the method is applied to a single cylinder of cylinder bank 9 and the other cylinders are involved as well. This individual cylinder is selected to be the cylinder to which the worst assumptions apply. In the present application example, this is cylinder 4, which is furthest away from hydraulic valve 10 and thus exhibits the longest delay between the opening of hydraulic valve 10 and the charge changing valves being cut out or in. It is understood that the method described can be used similarly on individual cylinders when these cylinders can be cut in or out independently of the other cylinders. The further improvement in the exhaust values that results from individual control is not utilized in the present case because the cost required to do so does not yield a corresponding benefit with the current state of the art in charge changing valves that can be cut in and out; if this technology improves, however, it can be expected that worthwhile results can be achieved with individual control.

Figure 2:
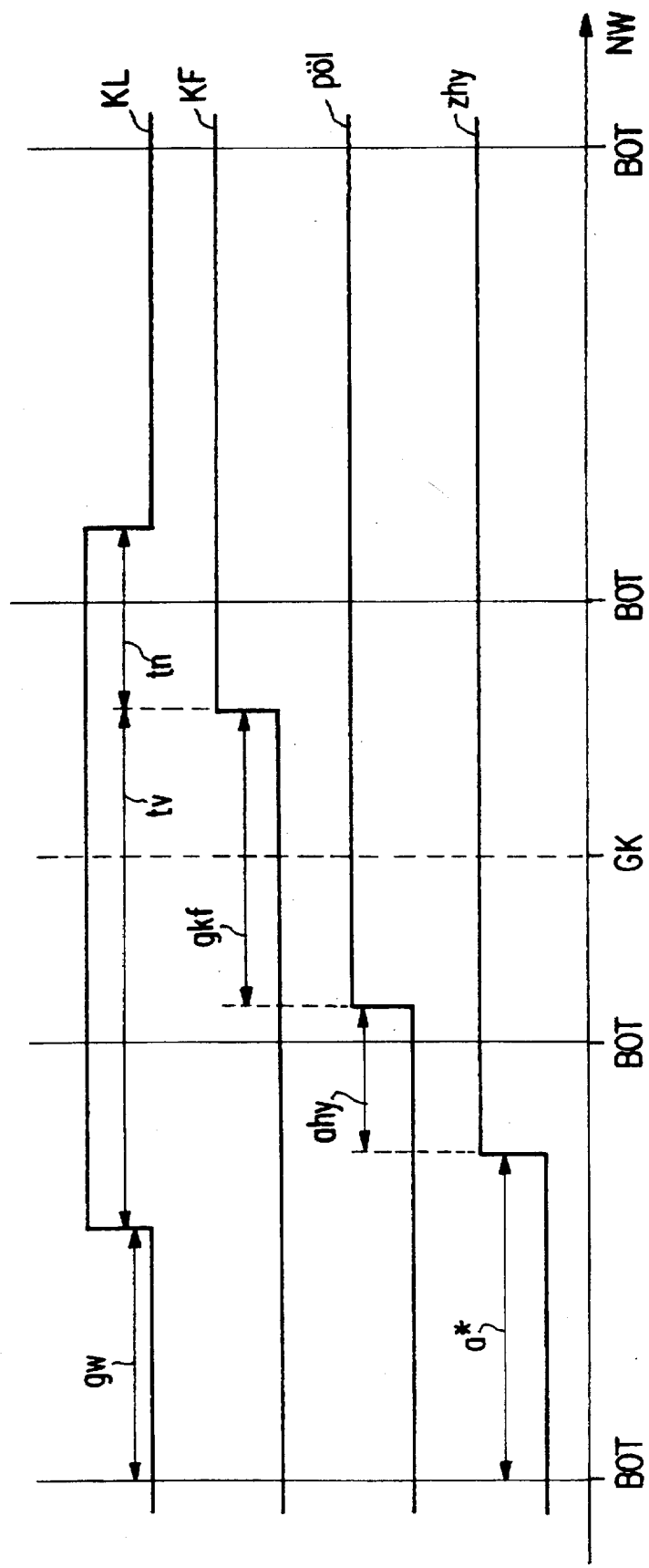
FIG. 2 is a graph showing the cylinder cut-in method according to a preferred embodiment of the present invention.

The invention will first be described in theory on the basis of the graph shown in FIG. 2. Unless stated otherwise, these parameters always relate to cylinder 4. All of the values of these parameters are plotted as a function of camshaft angle NW; the reference mark on the camshaft BOT is therefore shown as a vertical line and the distance between two reference marks BOT corresponds to four cycles of the internal combustion engine. The following are plotted, from top to bottom: the state KL of the signal from a lambda probe, the state KF of a characteristic map in control device 11, the oil pressure pöl, and the switch signal zhy.

Before the first reference mark BOT shown, as described above, control device 11 recognizes that a switch to six-cylinder operation is necessary and that second cylinder bank 9 must therefore be cut in. Then control device 11 first determines a lead time a* that begins to run when the next reference mark BOT is reached. After lead time a* has elapsed, the switch signal zhy is issued so that the charge changing valves of second cylinder bank 9 are cut in under the control of hydraulic valve 10. Due to the time required to build up the oil pressure pöl, the charge changing valves are not cut in immediately, but within a time required for hydraulic pressure buildup ahy. Time ahy is highly dependent on oil temperature töl and oil pressure pöl; consideration is also given to the fact that the three cylinders 4 to 6 must be cut in together and that these switching processes do not necessarily end at the same point in time.

The buildup of oil pressure pöl and hence the cutting in of the charge changing valves are monitored in that the time actually required for pressure buildup is detected and compared with the time ahy required for hydraulic pressure buildup. If a preset tolerance threshold is crossed, the process is terminated at this point and an error message is triggered; on the other hand, if the time detected is within the tolerance range, the time ahy for hydraulic pressure buildup is adapted.

Alternatively, it is possible to replace the monitoring of the oil pressure pöl by another method for determining the operating state of the valve drive (cutting the charge changing valves in and out). According to one preferred alternative, the moment the valve closes is detected to determine the operating state of the valve drive. Detection of valve closure is accomplished with the aid of acceleration sensors, which detect the structure-borne noise signal caused by the closing pulse (the valve striking the valve seat). Known detonation sensors can be used for the purpose, with one or more time windows being used to evaluate the signals delivered by the detonation sensors, in contrast to detonation recognition. As in detonation recognition, the time windows are specific for each charge changing valve, in other words the state of each charge changing valve can be determined separately. The time windows are also dependent on the currently selected contour of the camshaft, because they are chosen so that a closing pulse can be expected in such a time window. If the contour of the camshaft cannot be changed, the time window can also be chosen as a fixed value.

For further evaluation, the prepared signal is compared with threshold values associated with the various operating states of the valve drive. If, in the present example, the threshold value for the cut-in of the charge changing valve is not reached, the process is interrupted at this point and an error message is triggered. This test, as already mentioned, is valid for the charge changing valve checked with the time window. The scope of the test depends on the device used to cut the charge changing valves in and out. If the device acts to force all of the charge changing valves involved to switch, only one cylinder need be tested, in this case cylinder 4. If the device on the other hand switches each charge changing valve individually, it makes sense under certain conditions to test separately the switching state of each charge changing valve involved. Of course, the method described above also permits detecting the operating state of the valve drive to determine the actual time required for pressure buildup, with the time that elapses between the delivery of switching signal zhy and the recognition of a closing pulse being determined. Then the time ahy required for hydraulic pressure buildup can be compared once more and the time ahy required for hydraulic pressure buildup can be adjusted.

Cut-in of the charge changing valves is thus commenced and the fuel supply and possibly the ignition as well can then be cut in. Two processes then occur: firstly, after a lead time gkf has elapsed that begins to run at the end of the pressure buildup, the state KF of a characteristic map in the control device is switched from three-cylinder operation to six-cylinder operation and the fuel supply to cylinders 4 to 6, not fired as yet, is cut in. Secondly, during the active state KL of the signal from the lambda probe, the quantity of fuel supplied is changed by multiplying the basic characteristic maps.

With the state KL of the signal from the lambda probe, two areas can be distinguished: a preparatory phase tv during which the constantly fired cylinders 1 to 3 are acted on and which takes place prior to the switching of the state KF of the characteristic map, as well as a postpreparatory phase tn which follows the switching of the state KF of the characteristic map and during which both the constantly fired cylinders 1 to 3 and the re-fired cylinders 4 to 6 are acted on. When the postpreparatory phase tn has elapsed, cut-in is completed and engine 7 runs in six-cylinder operation.

It is important for conducting this process that all the procedures be so arranged that unnecessary delays are avoided. During the switch from three-cylinder to six-cylinder operation, the engine is in a state in which it is not controlled as far as exhaust is concerned and regulation of a stoichiometric ratio (air ratio=1) in the exhaust is not possible. On the other hand, this means that exhaust treatment cannot operate optimally here and an increase in exhaust emissions occurs. In order to keep the quantity of this additional exhaust component as low as possible, the processes are designed and adjusted to one another in such fashion that the delays are minimized to what is absolutely necessary. As will be described below, measures are also taken to produce an exhaust composition that is as favorable as possible even during the switch.

Thus, lead time a* is chosen such that the pressure buildup terminates at the end of a camshaft base circle GK of the cylinder 4 in question. This means that immediately after the charge changing valves are cut in, the inlet valve of cylinder 4 reopens and a new combustion cycle can thus be initiated. Waiting times between the cutting in of the charge changing valves and the resumption of combustion are therefore avoided. For this purpose, lead time a* takes into account the fact that, depending on the engine rpm nmot, initiation of the cut-in of a charge changing valve must be performed earlier in order to terminate with the same camshaft angle NW at the end of camshaft base circle GK.

The main reason the above problem arises is that the above parameters in this case are determined as time values and not as angle values. This in turn is due to the control device used in the embodiments, which controls the cutout and cut-in of the charge changing valves as a function of time and shuts off and turns on the fuel supply (camshaft) under angle control. Nevertheless, it is always times that are involved here, since the basic considerations apply to both time-controlled and angle-controlled processes, provided that special measures are required, as they are here, by the use of time control and coordination with an angle, in this case the mark GK.

As already described, time ahy for hydraulic pressure buildup is the time that is required after the adjustment of the hydraulic valve by switching signal zhy until the oil pressure pol reaches its set pressure on the cylinder 4 in question. Time ahy is largely dependent on oil temperature tol and oil pressure pol.

Delay gkf takes into account firstly that the charge changing valves are not cut in immediately after the oil pressure pol builds up, but that this cut-in extends over a certain space of time. This is due both to the time required for switching for mechanical reasons and also to the fact that in this case the entire second cylinder bank 9 is considered, whose cylinders 4 to 6 are operated, phase-shifted with respect to one another. In addition, delay time gkf takes into account the fact that, even after the safe cut-in of the charge changing valves, combustion that is not necessarily safe is possible in cylinders 4 to 6 that have been cut in. However, once again for reasons of exhaust composition, since assurance must be provided in all cases that the fuel that has been supplied is burnt as well, a delay then ensues until the charging conditions permit safe combustion. Then the switching described above of the state KF of a characteristic map and the cut-in of the fuel supply to cylinders 4 to 6 takes place.

Since the preparatory phase tv, from the time standpoint, is oriented to the switching of the state KF of a characteristic map, this point in time must be calculated in advance from delay gkf and the preparatory phase tv must be started, originating at this point. If preparatory phase tv is longer than delay gkf, it is also necessary to determine lead time a* and the time for hydraulic pressure buildup ahy to determine the moment of the shifting of the state KF of a characteristic map in order thus to start the preparatory phase tv beginning at reference mark BOT.

The charge changing valves of second cylinder bank 9 are cut in during preparatory phase tv. As a result, however, the flow conditions change in an intake section of engine 7 and thus the charge conditions in first cylinder bank 8 change. No regulation of the exhaust composition is possible any longer; instead, by controlled modification of the quantity of fuel supplied, an exhaust composition is controlled to be in the range of air ratio lambda=1. The exact setting is engine-specific and must be determined by testing. It is not absolutely necessary to replace the signals from the lambda probe, but it is also possible to adjust this signal in an established fashion.

This adjustment is also continued during the postpreparatory phase tn. Ideally, this takes place while, depending on the signal from the lambda probe, the total amount of fuel fed to engine 7 leads to an air ratio of lambda=1 with the start of combustion in the cylinders in second bank 9 taking precedence and the cylinders in first bank 8 then being supplied with fuel accordingly.

Control of this kind is not always possible, however. In the simplest case, therefore, the signal from the lambda probe can be replaced by a fixed signal level chosen so that engine 7 is operated with a slightly enriched mixture. To improve this simple design, at the beginning of fuel feed to the cylinders in second cylinder bank 9, a transition can be made from operation with an enriched mixture to the characteristic map that is used during six-cylinder operation. At the same time, likewise with a transition function, the quantity of fuel supplied to the cylinders in second cylinder bank 9 is steadily increased, since the charging of the cylinders in second cylinder bank 9 during the postpreparatory phase tn continues to improve until, finally, at the end of postpreparatory phase tn, that value that can be derived from the characteristic map for six-cylinder operation is reached.

In addition, during the postpreparatory phase tn, for starting to fire the cylinders in the second cylinder bank, it can be advisable initially to supply a single larger amount of fuel in order to restore the wetting of the intake section with fuel that usually prevails.

It should be noted in connection with the processes described above that a design criterion for cutting in the fuel feed is an exhaust composition that has an area ratio of 1 that is as undisturbed as possible over the entire process. A discontinuity in the torque delivered by the engine, which adversely affects driving comfort, can then be reduced by adjusting the ignition, for example adjusting the ignition angle, for the duration of the switch.

Figure 3:
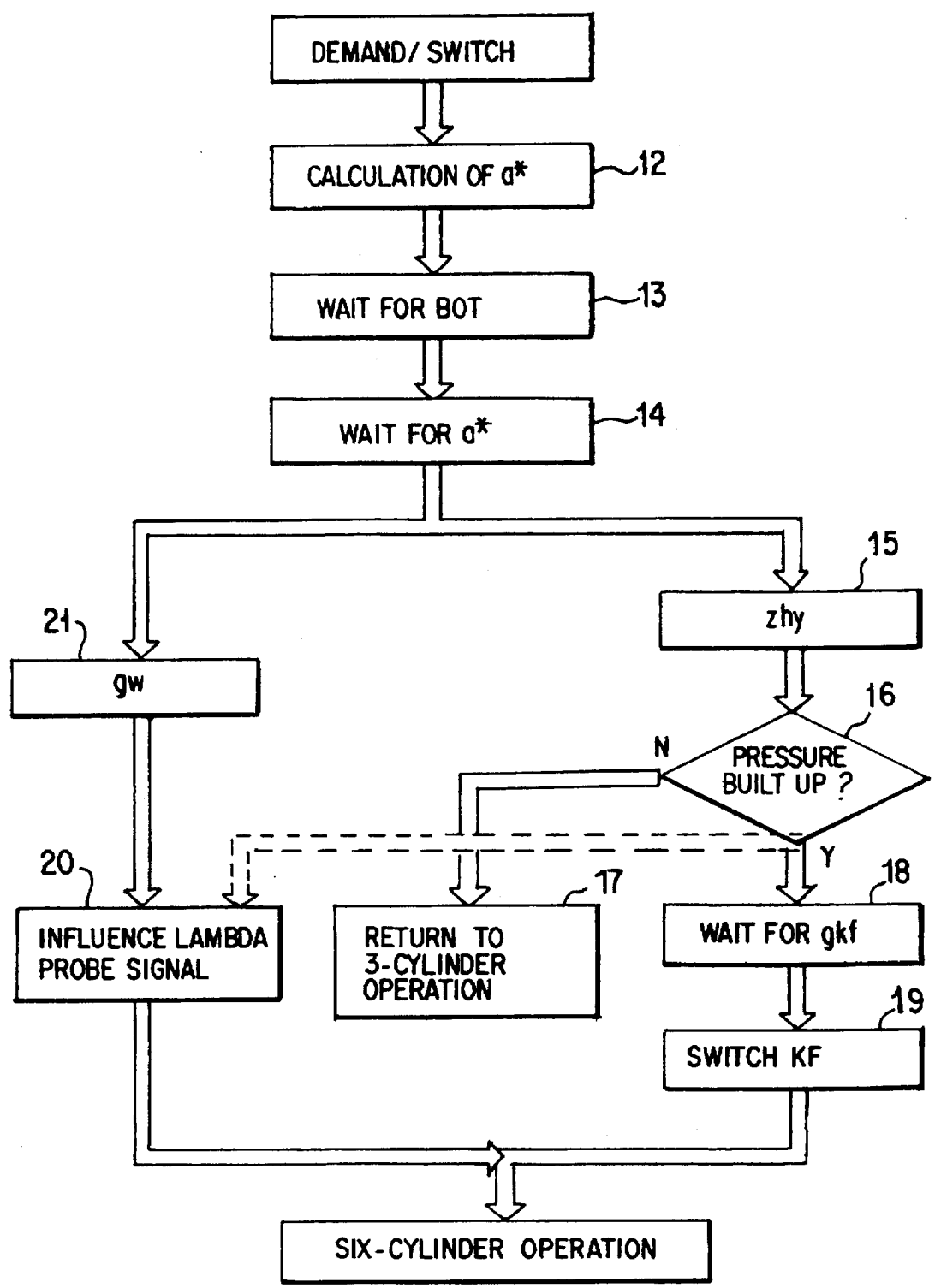
FIG. 3 is a process flowchart showing the method according to a preferred embodiment of the present invention.

FIG. 3 shows the entire process once again in the form of a process flowchart. The process begins with the call for a switch. Initially, lead time a* is determined in Step 12. In Step 13 the next reference mark signal BOT and then in Step 14 lead time a* are awaited. In Step 15, valve 10 is controlled by output of the switch signal zhy and monitoring is conducted in Step 16 to determine whether oil pressure p ol, following the elapse of the time ahy for hydraulic pressure buildup, plus a tolerance time, has reached its set value. If this is not the case, hydraulic valve 10 is cut out in Step 17 and the process ends with an error message. Otherwise, delay gkf is awaited in Step 18 and, after this time has elapsed, the state KF of the characteristic map is switched in Step 19 from three-cylinder operation to six-cylinder operation. Parallel to Steps 18 and 19 and 15 to 19, the signal of the lambda probe is influenced in Step 20. Whether this takes place following the elapse of a waiting time gw provided in Step 21 or following the positive inquiry in Step 16, depends, as described above, on the required duration of influence.

Figure 4:
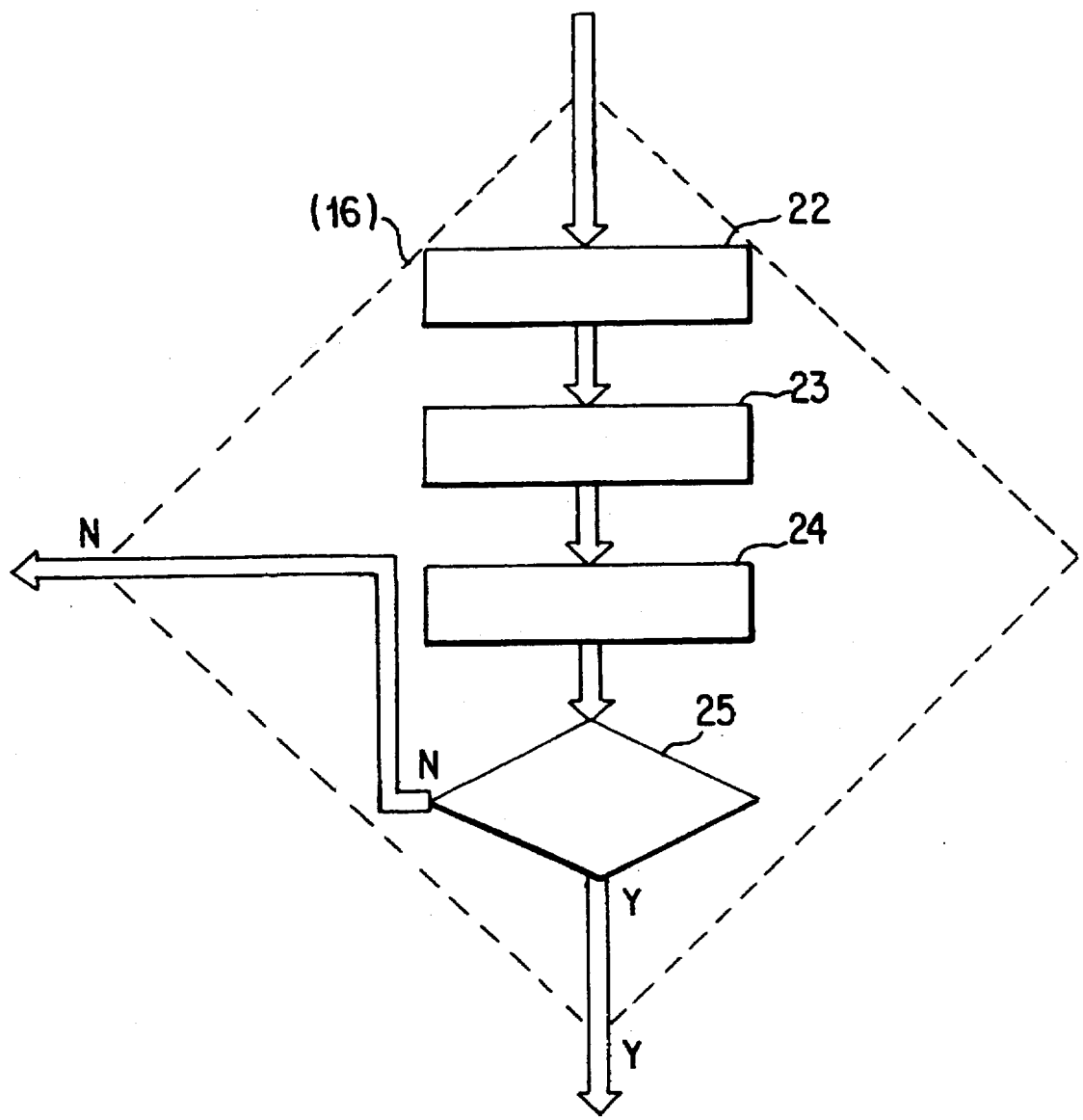
FIG. 4 is a process flowchart showing the process of an alternative to Step 16 in FIG. 3.

Alternatively, it is possible to replace the monitoring of oil pressure pöl in Step 16 by a method for determining the operating state of the valve drive (cutting the charge changing valves in and out), in which the time of valve closure is determined. This method is shown in FIG. 4; the steps shown here replace Step 16 in FIG. 3. In Step 22, the time window for the currently selected camshaft contour and the corresponding threshold valve for the closing pulse are determined from a table. If both the contour and the rotational angle position of the camshaft cannot be changed, the two values are constant and Step 22 can be eliminated. In Step 23, the time window previously determined is awaited and the signal delivered by the detonation sensor is determined in Step 24. In Step 25, the previously determined signal is compared with the threshold value. If the threshold value has not been reached, the charge changing valve tested with the selected time window has not been cut in and a branch is made to Step 17 in FIG. 3. On the other hand, if the threshold value has been reached, the tested charge changing valve has been cut in and the process is continued at Step 18 in FIG. 3.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for cylinder cut-in in an internal combustion engine having a plurality of cylinders, at least one of the cylinders having switchable charge changing valves and a switchable fuel supply, the switchable charge changing valves and the switchable fuel supply being switchable between a cutout state and a cut-in state, the internal combustion engine being connected to a regulated catalytic converter and a lambda probe being used for control, said method comprising the steps of:

cutting in the charge changing valves, determining whether the charge changing valves have been switched to the cut-in state, and cutting in the fuel supply to the cylinders, replacing a lambda probe signal by a replacement signal at least during the steps of cutting in the charge changing valves, determining whether the charge changing valves have been switched, and cutting in the fuel supply to the cylinders, and selecting the replacement signal so that an air ratio between exhaust from the cylinders which are in the cut-in state and exhaust from the cylinders which are in the cut out state is essentially equal to 1.

2. A method according to claim 1, wherein the charge changing valves are switched by hydraulic pressure, and wherein the charge changing valves are cut in according to the following steps:

cutting in the hydraulic pressure, waiting for a predetermined time which is normally required until the hydraulic pressure has built up, determining whether the hydraulic pressure has reached a minimum threshold value, and interrupting the cylinder cut-in if the hydraulic pressure is below the minimum threshold value.

3. A method according to claim 1, wherein the charge changing valves are cut in according to the following steps:

initiating cut-in of the charge changing valves, determining whether the charge changing valves have been cut in, interrupting the cylinder cut-in if the charge changing valves have not been cut-in.

4. A method according to claim 1, wherein the charge changing valves are cut in according to the following steps:

initiating cut-in of the charge changing valves, determining whether the charge changing valves have been cut in, interrupting the cylinder cut-in if the charge changing valves have not been cut-in;

wherein the step of determining whether the charge changing valves have been cut in comprises the following steps:

determining a time window valid for a camshaft contour currently selected and a corresponding closing pulse threshold value for a closing pulse of the charge changing valves, waiting for said time window, determining a detonation signal delivered by a detonation sensor, and comparing the detonation signal with the closing pulse threshold value:

determining that the charge changing valves have been cut in if the threshold value has been reached, and determining that the charge changing valves have not been cut in if the threshold value has not been reached.

5. A method for cylinder cut-in in an internal combustion engine having a plurality of cylinders, at least one of the cylinders having switchable charge changing valves and a switchable fuel supply, the switchable charge changing valves and the switchable fuel supply being switchable between a cutout state and a cut-in state, the charge changing valves being switched by hydraulic pressure, wherein the method comprises the steps of:

cutting in the charge changing valves, determining whether the charge changing valves have been switched to the cut-in state, and cutting in the fuel supply to the cylinders;

and wherein the charge changing valves are cut in according to the following steps:

cutting in the hydraulic pressure, waiting for a predetermined time which is normally required until the hydraulic pressure has built up, determining whether the hydraulic pressure has reached a minimum threshold value, and interrupting the cylinder cut-in if the hydraulic pressure is below the minimum threshold value.

6. A method for cylinder cut-in in an internal combustion engine having a plurality of cylinders, at least one of the cylinders having switchable charge changing valves and a switchable fuel supply, the switchable charge changing valves and the switchable fuel supply being switchable between a cutout state and a cut-in state, wherein the method comprises the steps of:

cutting in the charge changing valves, determining whether the charge changing valves have been switched to the cut-in state, and cutting in the fuel supply to the cylinders;

wherein the charge changing valves are cut in according to the following steps:

initiating cut-in of the charge changing valves, determining whether the charge changing valves have been cut in, interrupting the cylinder cut-in if the charge changing valves have not been cut in;

wherein the step of determining whether the charge changing valves have been cut in comprises the following steps:

determining a time window valid for a camshaft contour currently selected and a corresponding closing pulse threshold value for a closing pulse of the charge changing valves, waiting for said time window, determining a detonation signal delivered by a detonation sensor, and comparing the detonation signal with the closing pulse threshold value:

determining that the charge changing valves have been cut in if the threshold value has been reached, and determining that the charge changing valves have not been cut in if the threshold value has not been reached.

7. A method for cylinder cut-in in an internal combustion engine having a plurality of cylinders, at least one of the cylinders having switchable charge changing valves and a switchable fuel supply, the switchable charge changing valves and the switchable fuel supply being switchable between a cutout state and a cut-in state, wherein the method comprises the steps of:

cutting in the charge changing valves, determining whether the charge changing valves have been switched to the cut-in state, and cutting in the fuel supply to the cylinders;

wherein fuel is supplied during cylinder cut-in in such fashion that an essentially stoichiometric exhaust composition is produced, while discontinuities that occur in the output torque are converted into a smooth transition by changing an ignition angle.

* * * * *